S. PEACOCK.
PROCESS OF MAKING CEMENT AND OTHER PRODUCTS.
APPLICATION FILED JUNE 17, 1909.
939,078.
Patented Nov. 2, 1909.
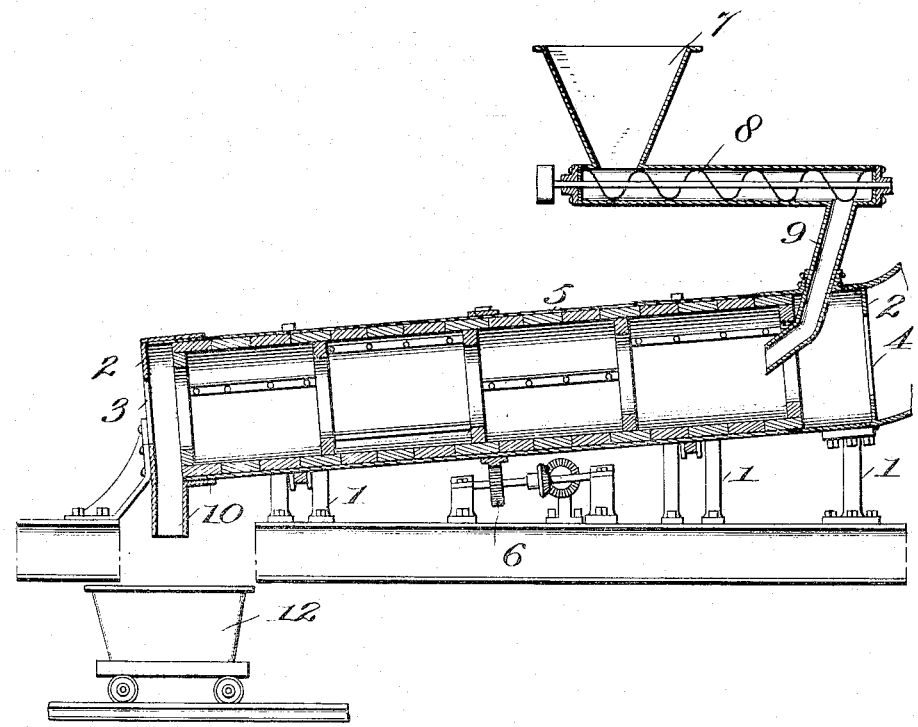

UNITED STATES PATENT OFFICE.

SAMUEL PEACOCK, OF CHICAGO, ILLINOIS, ASSIGNOR TO AMERICAN CYANAMID COMPANY, OF NEW YORK, N. Y., A CORPORATION OF MAINE.

PROCESS OF MAKING CEMENT AND OTHER PRODUCTS.

939,078.  Specification of Letters Patent.  Patented Nov. 2, 1909.

Application filed June 17, 1909. Serial No. 502,792.

*To all whom it may concern:*

Be it known that I, SAMUEL PEACOCK, a citizen of the United States, residing at Chicago, in the county of Cook and State of Illinois, have invented certain new and useful Improvements in Processes for Making Cement and other Products; and I do hereby declare the following to be a full, clear, and exact description of the invention, such as will enable others skilled in the art to which it appertains to make and use the same.

This invention relates to a process of making Portland cement and the pentoxid of phosphorus, $P_2O_5$, from phosphate rock, and has for its object the making of these two products in a single, simple, and comparatively less expensive manner, than heretofore.

To these ends the invention consists in the novel steps and combinations of steps constituting my process, fully hereinafter disclosed, and particularly pointed out in the claims.

Referring to the accompanying drawings forming a part of this specification, in which the figure is a diagrammatic sectional view of a well known type of rotary furnace:— 1 represents suitable supports, 2 stationary ends provided with an orifice 3 for the admission of fuel, and a passage 4 for the exit of the gases 5 a rotary barrel part adapted to receive the mixture, and 6 suitable mechanism for rotating said barrel.

7 represents a receiving hopper, 8 a screw conveyer, and 9 a delivery spout for the mixture, while 10 designates a delivery from the lower end of the furnace, under which suitable receptacles 12 may be placed.

As is well known, the essential constituents of Portland cement may be represented as composed substantially as follows:—

$$3CaO + SiO_2$$
$$2CaO + Al_2O_3$$
$$2CaO + Fe_2O_3$$

and it is equally well known that the proportions of the silica to the alumina and to the ferric oxid should conform to the formula:—

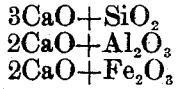

That is to say, the weight of the silica divided by the weight of the alumina, plus the ferric oxid, must give a quotient greater than 2, and less than 4.

The following analysis of phosphate rock, which may serve as a basis of computation, is also established, in which B. P. L. signifies bone phosphate of lime, or tri-calcium phosphate:

*Low Grade Phosphate Rock.*

| | |
|---|---|
| B. P. L. | 65.26 p. ct. |
| $CaCo_3$ | 10.31 " |
| $P_2O_5$ | 29.80 " |
| $CaO$ | 41.20 " |
| $Al_2O_3$ | 5.20 " |
| $Fe_2O_3$ | 2.90 " |
| $SiO_2$ | 14.00 " |
| $CO_2$ | 4.50 " |
| $H_2O$ | 2.40 " |

The following recognized average analysis of Portland cement may also be taken as a basis for calculation:—

| | |
|---|---|
| $SiO_2$ | 22.0 p. ct. |
| $CaO$ | 67.0 " |
| $Al_2O_3$ | 6.0 " |
| $Fe_2O_3$ | 2.0 " |
| $MgO$ | 3.0 " |

Ratio of $SiO_2$ to $Al_2O_3 + Fe_2O_3 = 2.75$.

In this latter analysis the alumina oxid, $Al_2O_3$, added to the ferric oxid, $Fe_2O_3$, amounts to 8%, while the silica, $SiO_2$, amounts to 22%. In other words, the ratio of $SiO_2$ to $Al_2O_3 + Fe_2O_3$, is about 2.75. The phosphate, however, of the first analysis, gives $SiO_2$ as 14%; and $Al_2O_3 + Fe_2O_3$ as 8.10%, or a ratio of only about 1.70; and it is evident, that if the Portland cement is to be made from such ingredients, it is necessary that this ratio be raised to about 2.70. In order to do this I add to every one hundred pounds of phosphate rock about 8.3 pounds of $SiO_2$, when the total acid oxids in the mixture become for each one hundred pounds of phosphate rock, about as follows:—

| | |
|---|---|
| Silica, $SiO_2$ | 22.3 lbs. |
| Aluminum oxid, $Al_2O_3$ | 5.2 " |
| Ferric oxid, $Fe_2O_3$ | 2.9 " |

Therefore, in order to satisfy the required reactions in making Portland cement, these acid oxides require calcium oxid, CaO, about as follows:—

22.30 lbs. SiO$_2$ require 62.20 lbs. CaO
5.20 " Al$_2$O$_3$ " 5.70 " " "
2.10 " Fe$_2$O$_3$ " 2.10 " " "

Total CaO required__ 70.00 lbs.

But, from the first analysis above, it is seen that 100 lbs. of the phosphate contains only 41.20 lbs. of calcium oxid, CaO; and, therefore, I add again to the mixture 28.80 lbs. CaO or 51.60 lbs. pure carbonate of lime in order to get the 70 pounds of CaO, necessary to satisfy the acid oxides present. When this is done I have a furnace mixture properly proportioned for producing Portland cement.

The reactions which occur in carrying out this process are as follows:

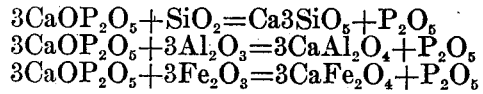

In other words, in carrying out my invention, I may take 100 lbs. of, say, low grade phosphate rock, of approximately the analysis above, and, I add thereto about 8.30 lbs. of silica, and about 51.60 lbs. of carbonate of lime, making a furnace mixture of 159.90 lbs. These ingredients are prepared in the ordinary way for making Portland cement, passed through and heated in a suitable Portland cement furnace, as that shown, to about 1400° C., during which treatment the following substances pass off as gases through the opening 4:—

Pentoxid of phosphorus, P$_2$O$_5$____ 29.8 lbs.
Carbon dioxid, CO$_2$, from phosphate rock_____ 4.5 "
Carbon dioxid, from limestone_____ 22.8 "
Water, H$_2$O _____ 2.4 "

Total _____ 59.5 "

That is to say, 159.9 lbs. of the furnace mixture produces 100.4 lbs. of residue or cement clinker and 29.8 lbs. of pentoxid of phosphorus, P$_2$O$_5$. I next convert the clinker, delivered through the passage 10, into finished cement in the usual way, and the P$_2$O$_5$, is recovered in any suitable manner, as by absorbing it in water.

About 380 lbs. of clinker will produce a barrel of cement of about 376 lbs., and, therefore, said barrel will require for its manufacture the following:—

Low grade phosphate rock__ 379 lbs.
silica_____ 31 "
lime carbonate__ 195 "

The 379 lbs. of phosphate rock, however, will contain 113 lbs, of phosphorous pentoxid, P$_2$O$_5$, and, if we allow a loss of 5% in the process of manufacture, the actual recovery of P$_2$O$_5$, to each barrel of cement will be 107 lbs. Accordingly, if my process of making Portland cement and recovering P$_2$O$_5$, is compared with the older process, it will be found that I get a product of 107 lbs. of free phosphorous pentoxid, P$_2$O$_5$, for each barrel of cement; and I also get a barrel of Portland cement at a cost of about the same as under the old process of making cement, omitting, of course, the cost of the phosphate rock.

It should be observed that my process does not require any carbon in the mixture, nor any reduction of the P$_2$O$_5$, at any stage of the process. In fact, it has been heretofore proposed to mold a mixture of phosphate and silica into balls and to treat the same with carbon in a cupola furnace. But, such a process cannot produce phosphorous pentoxid, P$_2$O$_5$, because the carbon present reduces the same; nor could such a procedure produce Portland cement and P$_2$O$_5$, should the carbon be omitted, because the production of a basic silicate is not possible without a very intimate intermixture of the lime and silicate. If the balls are present in the furnace, it is well known that the physical relations of the molecules are such that this intimate intermixture is not present and that, therefore, such basic silicate cannot be formed.

Of course, it is understood that the above analyses are merely illustrative, and the proportions of the various ingredients will vary according to the quality of the phosphate rock that may be actually selected in practice.

What I claim is:

1. The process of making free pentoxid of phosphorus, P$_2$O$_5$, and Portland cement in a single operation from phosphate rock, which consists in providing a rock mixture in which the ratio of the total silica SiO$_2$, to the total alumina and ferric oxid is greater than 2 and less than 4; and in suitably treating said mixture to form Portland cement and to separate and recover the P$_2$O$_5$; substantially as described.

2. The process of making free pentoxid of phosphorus, P$_2$O$_5$, and Portland cement in a single operation from a phosphate rock mixture which consists in causing sufficient silica, SiO$_2$, to be present in said rock to make the ratio of the total silica to the alumina and ferric oxid contained in said mixture greater than 2 and less than 4, and then suitably treating the mixture to form Portland cement and to separate and recover the free P$_2$O$_5$; substantially as described.

3. The process of making free pentoxid of phosphorus, P$_2$O$_5$, and Portland cement in a single operation from phosphate rock which consists in adding sufficient silica SiO$_2$, to said rock to make the ratio of the total silica to the alumina and ferric oxid in the mixture greater than 2 and less than 4; in adding sufficient calcium oxid, CaO, to combine with the acid oxids present; and in suitably treating the mixture thus obtained to form Portland cement and to separate and recover the free $P_2O_5$; substantially as described.

4. The process of making free pentoxid of phosphorus, $P_2O_5$, and Portland cement in a single operation from phosphate rock, which consists in adding to each one hundred pounds of phosphate rock substantially 8.3 pounds of silica $SiO_2$, and substantially 51.60 lbs. of carbonate of lime, suitably preparing and treating this mixture to form Portland cement and to drive off the $P_2O_5$; and in suitably recovering said $P_2O_5$; substantially as described.

5. The process of making Portland cement from a phosphate rock mixture, which consists in causing sufficient silica to be present in said mixture to make the ratio of the total silica to the total alumina plus the ferric oxid in the mixture, greater than 2 and less than 4; causing sufficient calcium oxid, CaO, to be present to chemically combine with the total acid oxids present in the mixture; and in suitably treating the mixture to cause the said ingredients to chemically react; substantially as described.

In testimony whereof, I affix my signature, in presence of two witnesses.

SAMUEL PEACOCK.

Witnesses:
T. A. WITHERSPOON,
ROLAND C. BOOTH.